(12) United States Patent
Morgan

(10) Patent No.: US 9,770,093 B2
(45) Date of Patent: Sep. 26, 2017

(54) COFFEE GRINDER CLEANING TOOL

(71) Applicant: Bonnie E. Morgan, Omaha, NE (US)

(72) Inventor: Bonnie E. Morgan, Omaha, NE (US)

( * ) Notice: Subject to any disclaimer, the term of this patent is extended or adjusted under 35 U.S.C. 154(b) by 0 days.

(21) Appl. No.: 14/589,997

(22) Filed: Jan. 6, 2015

(65) Prior Publication Data

US 2016/0000216 A1   Jan. 7, 2016

Related U.S. Application Data

(60) Provisional application No. 62/021,384, filed on Jul. 7, 2014.

(51) Int. Cl.
*A47L 13/12* (2006.01)
*A47J 42/00* (2006.01)
*A46B 15/00* (2006.01)

(52) U.S. Cl.
CPC ........... *A46B 15/0081* (2013.01); *A47J 42/00* (2013.01); *A47L 13/12* (2013.01); *A46B 15/0063* (2013.01); *A46B 15/0095* (2013.01)

(58) Field of Classification Search
CPC ............ A46B 15/0055; A46B 15/0095; A46B 15/0097; A46B 15/0063; A46B 2200/3073; A47J 42/00
USPC .................................. 15/105, 111, 160, 184
See application file for complete search history.

(56) References Cited

U.S. PATENT DOCUMENTS

| | | | | |
|---|---|---|---|---|
| 2,450,002 A * | 9/1948 | Jackson | ........................ | 401/124 |
| 2,701,378 A * | 2/1955 | Dugan et al. | ................... | 15/111 |
| 3,278,965 A * | 10/1966 | Frazier | ........................... | 15/184 |
| 3,599,263 A | 8/1971 | Cheiten | | |
| 5,419,000 A * | 5/1995 | Amato et al. | .................... | 15/111 |
| 5,513,411 A * | 5/1996 | Simon | ............................ | 15/111 |
| 5,832,940 A * | 11/1998 | Embry | ............... | A46B 11/0027 132/308 |
| 5,865,195 A * | 2/1999 | Carter | ................... | A45D 44/18 132/309 |
| 6,526,991 B2 * | 3/2003 | Bodwalk | ....................... | 132/309 |
| 6,973,932 B2 * | 12/2005 | Ko | ......................... | A61C 15/02 132/309 |
| 7,234,473 B1 * | 6/2007 | Winters | ............. | A46B 15/0071 132/309 |
| 7,832,955 B1 | 11/2010 | Leffew et al. | | |
| 7,918,620 B2 | 4/2011 | Del Ponte | | |
| 8,251,076 B2 * | 8/2012 | Souza | ................... | A45D 44/18 132/309 |
| 2003/0019059 A1 * | 1/2003 | Rooke | ................. | H01R 43/002 15/105 |

(Continued)

*Primary Examiner* — Michael Jennings
(74) *Attorney, Agent, or Firm* — Global Intellectual Property Agency, LLC; Jordan Sworen

(57) ABSTRACT

A coffee grinder cleaning tool for removing coffee grinds and particulate matter from a conventional coffee grinder. The coffee grinder cleaning tool includes an elongated shaft having a first end and a second end, wherein the first end includes a brush thereon and wherein the second end includes a scraper thereon. The elongated shaft further includes a fastener, such as a suction cup, for securing the device to a support surface, such as a side of a coffee grinder. A cleaning cap is removably securable to the first end of the cleaning tool and includes an interior volume in which the brush can be positioned. The cleaning cap further includes a protrusion extending therefrom that can be used to clean the underside of the blade of a grinder.

8 Claims, 2 Drawing Sheets

(56) References Cited

U.S. PATENT DOCUMENTS

| | | | |
|---|---|---|---|
| 2003/0088929 A1 | 5/2003 | Beary | |
| 2006/0048790 A1* | 3/2006 | Petner | A46B 11/002 132/309 |
| 2006/0124147 A1* | 6/2006 | Lo | A45D 29/04 132/75 |
| 2006/0207042 A1* | 9/2006 | Di Paolo | A46B 5/0095 15/111 |
| 2008/0052855 A1* | 3/2008 | Yang | A46B 3/16 15/171 |
| 2008/0189889 A1* | 8/2008 | Goldstein | 15/111 |
| 2008/0311282 A1* | 12/2008 | Hammon | A46B 5/00 427/2.29 |
| 2010/0050357 A1* | 3/2010 | Misner et al. | 15/167.1 |
| 2012/0027497 A1* | 2/2012 | Huang | A46B 9/021 401/16 |

\* cited by examiner

COFFEE GRINDER CLEANING TOOL

CROSS REFERENCE TO RELATED APPLICATION

This application claims the benefit of U.S. Provisional Application No. 62/021,384 filed on Jul. 7, 2014. The above identified patent application is herein incorporated by reference in its entirety to provide continuity of disclosure.

BACKGROUND OF THE INVENTION

Field of the Invention

The present invention relates to coffee grinder cleaning tools. More specifically, the present invention provides a hand-held coffee grinder cleaning tool comprising an elongated shaft with a brush on a first end thereof and a scraper on a second end thereof, and further including a cleaning cap removably securable to the first end of the device that includes a protrusion for cleaning the blade of a coffee grinder.

Many people own coffee grinders so that they can grind coffee beans in order to preserve the freshness of the coffee beans. However, after multiple uses, coffee grinds and other particulate matter can accumulate and adhere to the interior of the grinder. The coffee grinds can become stuck on the walls of the grinder and on the blade or blades of the grinder. Particulate matter may affect the operation of the grinder and may inhibit movement of the blades. Further, the particulate matter may be removed from the walls of the grinder during use, causing the fresh beans to be mixed with old particulate matter.

Accordingly, it is important to periodically clean coffee grinders to ensure that they function properly and so as to produce the freshest coffee possible. Many people may simply invert the coffee grinder and shake the grinder to remove particulate matter therefrom, however, this is ineffective in removing all of the particulate matter. Further, some people may use a wet washcloth or paper towel to dislodge particulates, but such methods do not allow the person to clean the crevices and other small spaces within the grinder. Thus, a tool for allowing a user to easily clean a coffee grinder without damaging the same is desired.

Description of the Prior Art

Devices have been disclosed in the prior art that relate to coffee grinder cleaning devices. These include devices that have been patented and published in patent application publications. These devices generally relate to tools having brushes for cleaning the interior of a coffee grinder. The following is a list of devices deemed most relevant to the present disclosure, which are herein described for the purposes of highlighting and differentiating the unique aspects of the present invention, and further highlighting the drawbacks existing in the prior art.

One such device, U.S. Published Patent Application Number 2003/0088929 to Beary discloses a wire cleaning brush. The device comprises an elongated, hollow tube having bristle wires bundled together and inserted into the tube such that a portion of the bristles project beyond the end of the tube. The end of the tube is crimped to secure the bristles in place. When the bristles wear down, the end can be uncrimped, and the wires can be further extended from the tube and trimmed in order to form new bristles. The second end of the tube can be cut to form a scraper tool. Thus, Beary discloses a cleaning implement, but does not disclose a cleaning implement for cleaning a coffee grinder that includes a removable cleaning cap for cleaning the underside of the blade of a grinder.

Another device, U.S. Pat. No. 7,918,620 to Del Ponte discloses a magnetically mated cosmetic brush. The device comprises a cosmetic applicator having a magnet and a cosmetic holder having a magnet for securing the cosmetic applicators in place thereon. Thus, Del Ponte discloses a magnetized cosmetic applicator and holder and does not disclose a coffee grinder cleaning tool having a brush, a scraper, and a removable cleaning cap disposable over said brush.

U.S. Pat. No. 5,419,000 to Amato et al. discloses a brush with a removable scraper. The device comprises a brush having bristles and a bristle retaining structure. The brush body includes an engaging recess and a scraper removably securable to the recess. Thus, Amato et al. fails to disclose a coffee grinder cleaning tool comprising an elongated shaft having a brush at one end thereof and a scraper at a second end thereof, wherein a cleaning cap is provided that is removably securable to the brush end of the device.

U.S. Pat. No. 3,599,263 to Cheiten discloses a combination brush and scraper for cleaning toilet bowls. The device comprises an elongated body with a specially shaped scraper at the end thereof. Bristles extend back from the scraper and are positioned around the elongated body. The bristles are arranged in a C-shape for cleaning the upper rim of a toilet bowl. Thus, Cheiten discloses a toilet bowl cleaning device and does not provide a coffee grinder cleaning tool having an elongated shaft with a brush at a first end thereof and a scraper at a second end thereof.

U.S. Pat. No. 7,832,955 to Leffew et al. discloses a windshield ice scraper with a de-icing solution dispenser. The device comprises a handle having a detachable snow brush thereon. The handle includes a reservoir filled with de-icing solution with a spray pump trigger for spraying fluid on the windshield to facilitate de-icing. Thus, Leffew et al. provides a device for removing ice from a windshield and does not provide a coffee grinder cleaning tool.

Finally, U.S. Pat. No. 2,701,378 to Reinbolt et al. discloses a cleaning tool having a combination scraper and brush. The cleaning tool comprises a body member with a scraper at a first end and a brush at a second end. The body member is slidably mounted in a supporting case, wherein the scraper or brush can be projected from the case, or the brush and scraper can be concealed when the device is not in use. Reinbolt fails to disclose a coffee grinder cleaning tool comprising a removable cleaning cap adapted to clean the underside of a coffee grinder blade.

These prior art devices have several known drawbacks. The devices in the prior art generally relate to cleaning tools having scraper and brush elements. However, the devices in the prior art are not adapted for cleaning the small and confined spaces within a coffee grinder. Further, the devices fail to provide a removable cleaning cap used to clean the blade of a coffee grinder. Thus, the devices in the prior art are not suited for removing particulate matter and coffee grinds from the interior of a coffee grinder.

In light of the devices disclosed in the prior art, it is submitted that the present invention substantially diverges in design elements from the prior art and consequently it is clear that there is a need in the art for an improvement to existing coffee grinder cleaning tools. In this regard the instant invention substantially fulfills these needs.

SUMMARY OF THE INVENTION

In view of the foregoing disadvantages inherent in the known types of coffee grinder cleaning tools now present in the prior art, the present invention provides a new coffee grinder cleaning tool wherein the same can be utilized for providing convenience for the user when removing coffee grinds and particulate matter that had accumulated on the interior of a coffee grinder.

It is therefore an object of the present invention to provide a new and improved coffee grinder cleaning tool that has all of the advantages of the prior art and none of the disadvantages.

It is another object of the present invention to provide a coffee grinder cleaning tool comprising an elongated rod with a brush on a first end thereof and a scraper on a second end thereof.

Another object of the present invention is to provide a coffee grinder cleaning tool having a fastener thereon for securing the cleaning tool to a support surface, such as the side of a coffee grinder.

Yet another object of the present invention is to provide a coffee grinder cleaning tool having a removable cleaning cap with a protrusion thereon for cleaning the underside of the blade of the coffee grinder.

Another object of the present invention is to provide a coffee grinder cleaning tool that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
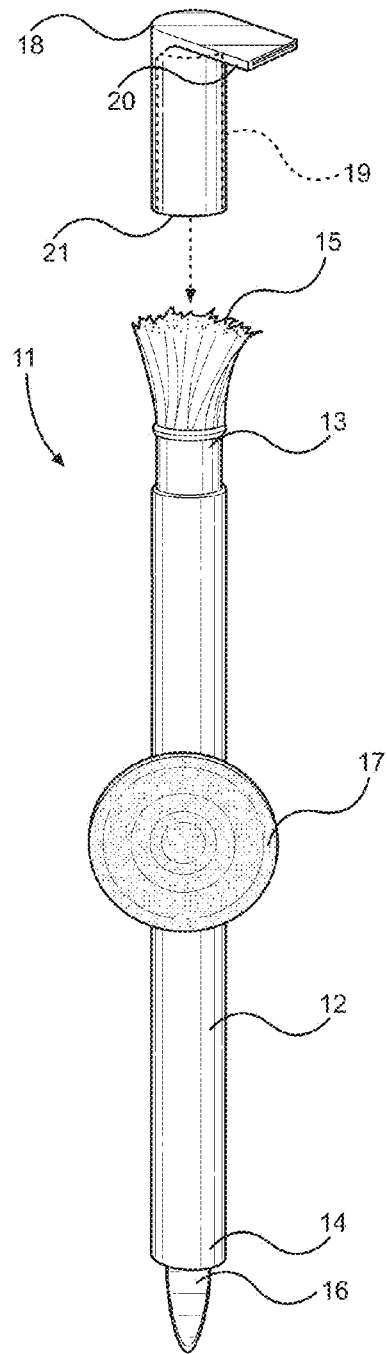
FIG. 1A shows a perspective view of the coffee grinder cleaning tool of the present invention with the cleaning cap removed therefrom.

Reference is made herein to the attached drawings. Like reference numerals are used throughout the drawings to depict like or similar elements of the coffee grinder cleaning tool of the present invention. For the purposes of presenting a brief and clear description of the present invention, the preferred embodiment will be discussed as used for removing coffee grinds and particulate matter accumulated on the interior of a coffee grinder. The figures are intended for representative purposes only and should not be considered to be limiting in any respect.

Figure 1B:
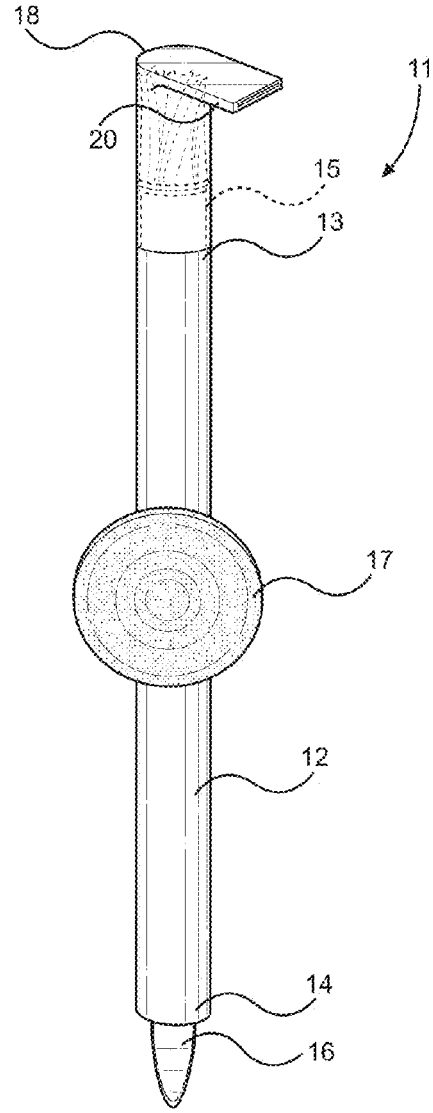
FIG. 1B shows a perspective view of the coffee grinder cleaning tool of the present invention with the cleaning cap secured thereon.

Referring now to FIGS. 1A and 1B, there are shown perspective views of the coffee grinder cleaning tool of the present invention with and without the cleaning cap secured thereon. The cleaning tool 11 comprises an elongated shaft 12 having a first end 13 and a second end 14. The elongated shaft 12 is preferably cylindrical in shape, but may include other shapes and cross sections. The cleaning tool 11 is preferably composed of a durable plastic material, or a lightweight metal material, such as aluminum. However, the cleaning tool 11 can be composed of various other materials in alternate embodiments. The shaft 12 further comprises a fastener 17 thereon. In the illustrated embodiment, the fastener 17 is a suction cup secured to a portion of the shaft 12. The suction cup can be removably secured to a support surface, such as the exterior of a coffee grinder so that the cleaning tool 11 is readily available to the user.

The first end 13 of the elongated shaft 12 includes a brush 15 thereon that is composed of a plurality of bristles. The brush 15 is adapted to allow the user to remove coffee grinds and particulate matter that has adhered to various crevices of a coffee grinder, such as areas on the wall of the grinder and areas surrounding the blade of the grinder. The brush 15 allows a user to easily clean all particulate matter inside of the grinder without scraping or otherwise damaging the grinder.

The second end 14 of the elongated shaft 12 includes a scraper 16 thereon. The scraper 16 comprises a flat, sharpened member adapted to allow a user to scrape particulate that is deep within a crevice and cannot be removed by a brush 15. Further, the scraper 16 can be used to remove particulate matter that is more strongly adhered to the coffee grinder, and cannot be removed by use of the brush 15 alone. The scraper 16 preferably tapers towards a point at the end thereof. In the illustrated embodiment, the scraper 16 comprises a spade shape, however, the scraper 16 may have other shapes in alternate embodiments. The scraper 16 can be composed of plastic, wood, or a metal material.

A cleaning cap 18 is further provided that is removably securable to the first end 13 of the elongated shaft 12. The cleaning cap 18 includes an interior volume 19 and an open end 21 providing access to the interior volume 19. The cleaning cap 18 and the interior volume 19 thereof are sized so as to receive the brush 15 of the cleaning tool 11 therein. Thus, the cleaning cap 18 serves to enclose and protect the brush 15 when it is not in use. The cleaning cap 18 can be removably secured to the first end 13 of the elongated shaft 12 via a press fit or snap connection. Further, the cleaning cap 18 includes a protrusion 20 thereon for use in cleaning the coffee grinder blade or blades. Preferably, the protrusion 20 includes a flat, substantially planar member as shown in the illustrated embodiment. The protrusion 20 is adapted to allow a user to easily clean the underside of the blades of a coffee grinder.

Figure 2:
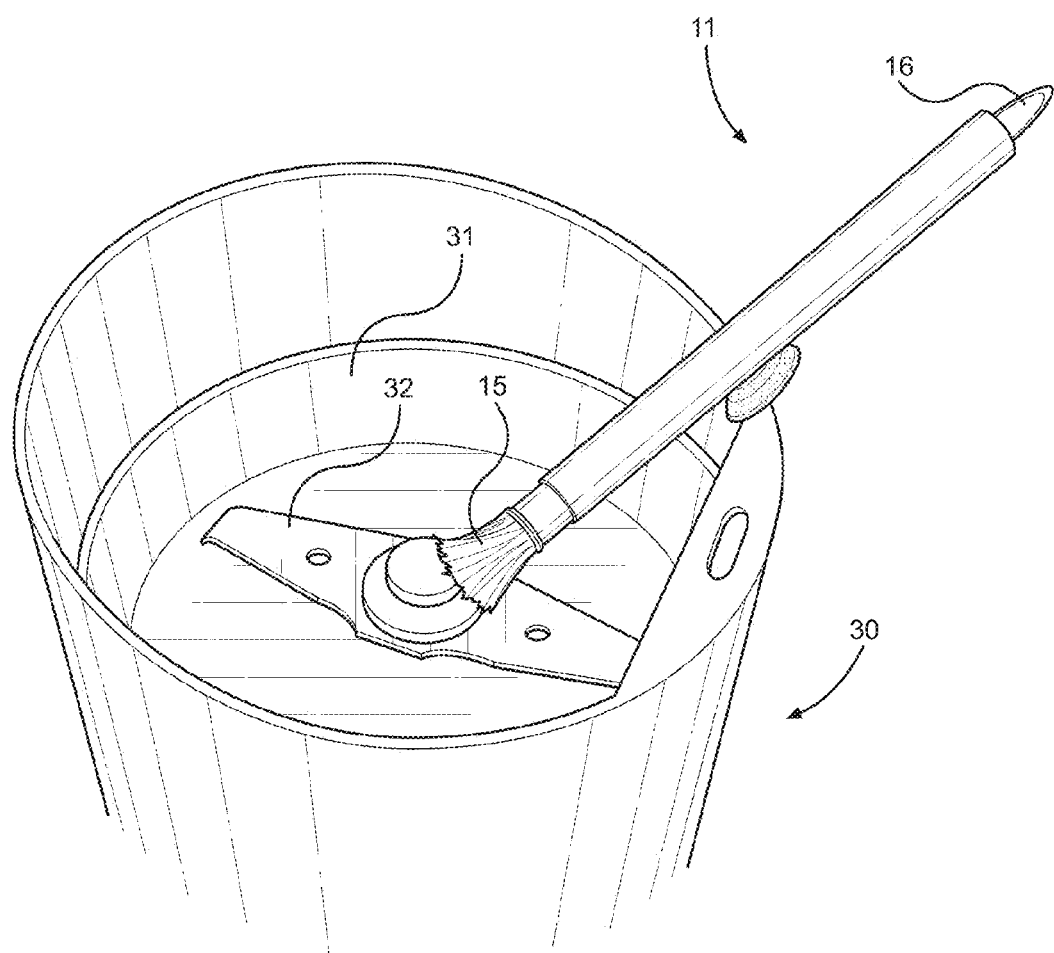
FIG. 2 shows a perspective view of the coffee grinder cleaning tool of the present invention as used to clean a coffee grinder.

Referring now to FIG. 2, there is shown a perspective view of the coffee grinder cleaning tool of the present invention as used to clean a coffee grinder. A conventional coffee grinder 30 comprises a receptacle having an open upper end, in which coffee beans can be placed. The walls 31 of the receptacle include ridges and crevices in which coffee particulates can accumulate. Further, the base of the receptacle includes a rotatable blade 32 thereon for grinding the beans. Thus, coffee grinds can accumulate in the areas underneath and around the blade 32. Such spaces can be difficult to reach with the user's finger or a washcloth.

In operation, a user can hold the elongated shaft in one hand with either the first end or second end oriented towards the interior of the grinder. The user can position the first end having the brush 15 thereon towards the grinder 30 for brushing the walls 31 and the blade 32 of the grinder 30 in order to gently remove particulate thereon. The brush 15 does not scrape or damage the grinder 30 and allows the user to access small spaces and crevices in the grinder 30. The user can also attach the cleaning cap onto the first end of the elongated shaft and can use the protrusion thereon to clean the underside surface of the blade 32. The user can move the cleaning tool 11 side-to-side and in various motions in order to clean the blade 32.

Alternatively, the user can hold the cleaning tool 11 with the second end having the scraper 16 thereon facing towards the grinder 30. The user can gently scrape various surfaces of the grinder 30 in order to remove particulate matter that cannot be removed with the brush 15 alone. The scraper 16 includes a pointed end for allowing the user to access crevices and remove particulates therein.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A coffee grinder cleaning tool, comprising:
    an elongated shaft having a first end and a second end;
    a brush on said first end;
    a scraper on said second end;
    a fastener on said elongated shaft for securing said elongated shaft to a support surface;
    a cleaning cap removably securable to said first end of said elongated shaft via either one of a press fit or a snap connection;
    a protrusion on an upper end of said cleaning cap, wherein said protrusion is perpendicular to said elongated shaft;
    wherein said fastener is accessible when said cleaning cap is secured to said first end of said elongated shaft.

2. The coffee grinder cleaning tool of claim 1, wherein said fastener comprises a suction cup.

3. The coffee grinder cleaning tool of claim 1, wherein said elongated shaft is substantially cylindrical.

4. The coffee grinder cleaning tool of claim 1, wherein said scraper comprises a spade shape.

5. The coffee grinder cleaning tool of claim 1, wherein said scraper comprises a pointed end.

6. The coffee grinder cleaning tool of claim 1, wherein said cleaning cap comprises an interior volume in which said brush on said first end can be positioned when said cleaning cap is secured to said first end of said elongated shaft.

7. The coffee grinder cleaning tool of claim 1, wherein said protrusion comprises a flat, planar member.

8. A coffee grinder cleaning tool, comprising:
    an elongated shaft having a first end and a second end;
    a brush comprising a plurality of bristles disposed on said first end, said plurality of bristles extending in a direction parallel to the elongated shaft;
    a spade-shaped scraper disposed on said second end, said scraper comprising a pointed end extending in a direction parallel to the elongated shaft;
    a suction cup disposed on a portion of said elongated shaft for securing said elongated shaft to a support surface;
    a cleaning cap removably securable to said first end of said elongated shaft via either one of a press fit or a snap connection, said cleaning cap having an interior volume in which said brush can be positioned when said cleaning cap is secured to said first end of said elongated shaft, and wherein said cleaning cap includes a protrusion thereon;
    wherein said protrusion is disposed on an end of said cleaning cap opposing an open end of said cleaning cap, wherein said protrusion is perpendicular to said elongated shaft, and wherein said protrusion comprises a width equal to a diameter of the cleaning cap.

* * * * *